United States Patent
Ravishankar et al.

(10) Patent No.: US 6,226,304 B1
(45) Date of Patent: May 1, 2001

(54) LEASED LINE OPTIMIZATION AND VOICE QUALITY IMPROVEMENT IN BANDWIDTH CONSTRAINED COMMUNICATION SYSTEMS

(75) Inventors: Channasandra S. Ravishankar, Germantown; Mohammad Soleimani, Rockville, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/075,568

(22) Filed: May 11, 1998

Related U.S. Application Data
(60) Provisional application No. 60/072,830, filed on Jan. 28, 1998.

(51) Int. Cl.[7] .............................. H04B 7/185; H04B 3/12; H04L 12/56
(52) U.S. Cl. .................... 370/527; 370/316; 370/401; 370/474; 370/477; 455/428; 455/445
(58) Field of Search .................................. 370/316, 317, 370/401, 474, 477, 527; 455/428, 445, 63

(56) References Cited

U.S. PATENT DOCUMENTS

| | | | |
|---|---|---|---|
| 4,123,711 | * 10/1978 | Chow | 325/62 |
| 5,666,357 | * 9/1997 | Jangi | 370/345 |
| 5,740,542 | * 4/1998 | Leeper | 455/516 |
| 5,745,839 | * 4/1998 | Lieberman | 455/10 |
| 5,975,531 | * 11/1999 | Rebec | 275/240 |

* cited by examiner

*Primary Examiner*—Hassan Kizou
*Assistant Examiner*—Roberta Stevens
(74) *Attorney, Agent, or Firm*—John T. Whelan; Michael W. Sales

(57) ABSTRACT

The present invention is embodied in a method an apparatus for reducing the number of leased E1 lines needed to backhaul communication traffic in a satellite communication situation. The present invention receives and decompressed a satellite signal. A copy of the compressed signal is then encoded into the least significant bits (LSBs) of the decompressed signal. The decompressed signal having the embedded information may be routed to an international PSTN network over leased communications lines. However, the compressed information is extracted from the decompressed signal and sent across the E1 lines, thereby conserving communication bandwidth and reducing the number of leased lines required. After passing through the E1 lines the information is decompressed and connected to the international PSTN network. Alternatively, the decompressed signal having the embedded information may be distributed to local PSTN networks, which interpret decompressed signals. The degradation in voice quality of the decompressed signal due to the embedding of the compressed information in negligible.

18 Claims, 6 Drawing Sheets

LEASED LINE OPTIMIZATION AND VOICE QUALITY IMPROVEMENT IN BANDWIDTH CONSTRAINED COMMUNICATION SYSTEMS

This application claims benefit of Provisional No. 60/072,830, filed Jan. 28, 1998.

BACKGROUND OF THE INVENTION (a) Field of the Invention

The present invention relates generally to digital communications and, more particularly to a method and apparatus for (i) backhauling compressed voice in a digital communication system without additional degradation in voice quality, thereby reducing the number of leased PCM trunks and (ii) improving voice quality on calls that involve multiple voice compressed links using similar voice compression technology such as mobile-to-mobile calls in cellular or mobile satellite systems.

(b) Description of Related Art

The most common form of digital modulation used in communications is pulse code modulation (PCM). PCM represents a message as a sequence of coded digital pulses. PCM is used in communication systems to transfer voice or data from one location to another via a communication link, which may include a wire link such as an E1 line or a wireless link such as a satellite communication link. Typically, PCM is used to represent an analog signal in digital form. In the communications industry, PCM is used to refer to a digital communication link that operates at a 64 kilobits per second (kbps). There are eight thousand samples of an analog signal taken every second, and each sample is represented by eight bits, hence 64 kbps.

Bandwidth conservation is a concern in almost all communication applications. In a digital satellite link, for example, a 64 kbps signal is compressed and transmitted at 4 kbps to save bandwidth. For example, a subscriber unit in a communication system may sample a user's voice at a rate equivalent to 64 kbps or more, however, that signal is compressed into a signal that is 4 kbps before it is uplinked to a satellite. The satellite receives the signal from the subscriber unit and rebroadcasts it to a gateway. The gateway receives the downlinked signal from the satellite and decompresses the signal back to a 64 kbps signal. The compression and decompression of a signal in such a manner mildly compromises the integrity of the signal. However, each successive signal compression and decompression introduces more noise into the signal.

In many satellite communication systems the gateway decompresses the signals to 64 kbps and couples them to leased terrestrial E1 transmission lines that eventually connect with a conventional PSTN network. The number of E1 lines needed is proportional to the bandwidth that must be carried from the gateway to the PSTN network. In many applications the leased E1 lines may span many hundreds of miles and may traverse the boarders of many countries. The lease rates for E1 lines are based on required bandwidth and line length. Additionally, traversal of national borders may increase the cost to lease a particular E1 line. All of these line leasing costs are typically passed on to the user placing the telephone call.

The cost associated with leasing E1 lines for hauling traffic between a gateway (or base station) to a point of presence (POP) in a national or international network can be readily appreciated. Accordingly, it would be desirable to have a method and apparatus for reducing the costs associated with the leasing of the E1 lines in a satellite communications.

It is possible to perform one more (possibly different) compression and decompression steps on the information to be sent across E1 lines to achieve cost reduction. However, the overall voice quality degradation can be easily noticeable and will be worse than the worst performance of the two compression and decompression schemes. A similar problem exists in many satellite and cellular systems when voice calls are established between two satellite users (using two satellite hops) or two cellular users. The heart of the present invention is to achieve cost reduction and, at the same time, avoid voice quality degradation.

SUMMARY OF THE INVENTION

The present invention is embodied in a gateway for transferring data representative of voice from a first location to a second location. The gateway includes a voice decoder for decompressing a compressed voice signal received from a satellite; a voice packetizer and embedder for embedding the compressed signal within the decompressed signal; and a transcoder for removing the embedded compressed signal from the decompressed signal and delivering the compressed signal to a communication line.

The present invention is also embodied in a method for transferring data representative of voice from a first location to a second location comprising. The method includes the steps of decompressing a compressed voice signal received from a satellite to create a decompressed signal; embedding the compressed signal within the decompressed signal; removing the embedded compressed signal from the decompressed signal; and
delivering the compressed signal to a communication line.

The present invention is further embodied in a transcoder for transferring data representative of voice from a first communication line to a second communication line. The transcoder includes a voice decoder for decompressing a compressed voice signal received from the first communication line and a linear to A-law format converter for converting the decompressed signal to an A-law format and for coupling the decompressed A-law format signals to the second communication line.

The invention itself, together with further objects and attendant advantages, will best be understood by reference to the following detailed description, taken in conjunction with the accompanying drawings.

DESCRIPTION OF THE PREFERRED EMBODIMENTS

Currently satellite communication systems require a large number of leased E1 lines to backhaul communication traffic from a satellite gateway (downlink station) to PSTN networks located at points of presence (POP). In many instances, the leased E1 lines may cover vast distances and may cross international borders, thereby increasing the cost to lease the lines. This increased cost is passed on to the communication system users.

The present invention is embodied in a method and apparatus for reducing the number of leased E1 lines needed for backhauling communication traffic in a satellite system without voice quality degradation. The present invention receives and decompresses compressed signals from a satellite. After the signals are decompressed, the compressed information is embedded into the decompressed signals. The system may then communicate the compressed or decompressed information to landline users. The compressed information may be sent across leased E1 lines to reduce the number of lines needed. That is, by sending compressed information across the leased lines, fewer lines are needed.

Figure 1:
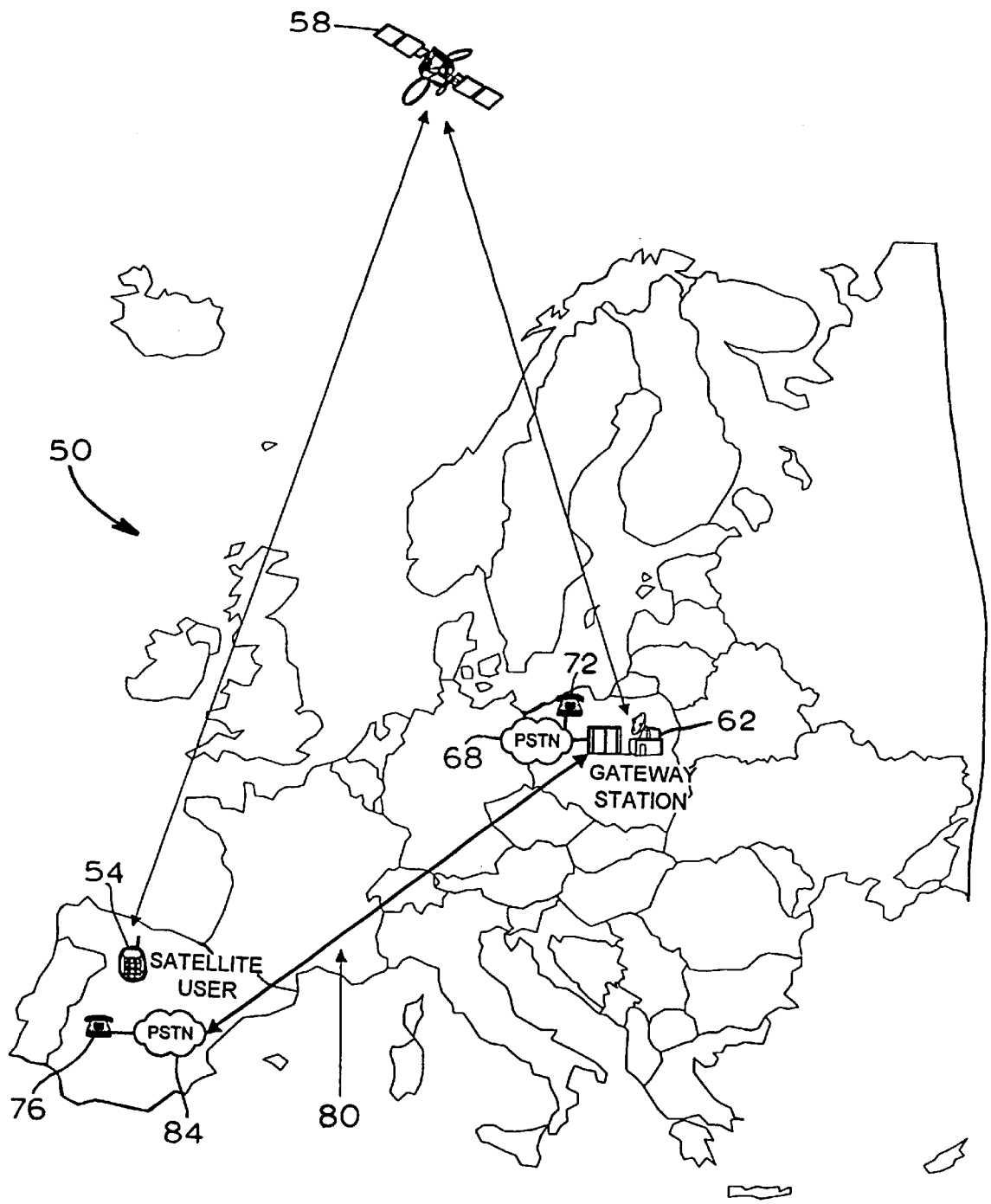
FIG. 1 is an illustration of a satellite communication link that may employ the present invention.

Referring now to FIG. 1, an illustration of a typical communication system 50 that may employ the present invention is shown. In the disclosed example, a system user in Spain places a call using a subscriber unit 54. The subscriber unit 54 transmits voice information to a satellite 58, which is located in high or medium earth orbit. The satellite receives the uplinked information, translates its frequency, and downlinks the information to a gateway station 62, which may be located, for example, in Poland. Due to the expense associated with gateway stations, a single gateway station may support a significant geographical area. For example, as shown in FIG. 1, a gateway station 62 in Poland may support many surrounding European countries.

The gateway station 62 receives the downlinked signal and routes the voice information to a PSTN 68 or 84 at a point of presence (POP) that serves a person to whom the subscriber unit user is speaking (i.e., the person on the land line). For example, if the person on the land line is located in Poland, the gateway station 62 may couple the received satellite signal to a local PSTN 68 in Poland. The local PSTN 68 proceeds to route the call to the land line user's telephone 72 in a conventional manner.

Alternatively, the call placed at the subscriber unit 54 may be intended for a person whose telephone 76 is located in, for example, Spain. In this case, the gateway 62 located in Poland, which serves a broad geographic region, receives the downlinked signal and couples it to leased E1 lines 80. The E1 lines 80 link the signal from the gateway station 80 to a PSTN 84 located in Spain. The process of linking the gateway station to a PSTN via E1 lines is commonly referred to as backhauling. The PSTN, in turn, couples the signal to the land line user's telephone 76 located in Spain. The present invention may be implemented at the gateway station 62 of the communication system 50 shown in FIG. 1. The present invention reduces the number of E1 lines 80 needed to backhaul communication traffic from the gateway station 62 to various PSTN networks.

Figure 2A:
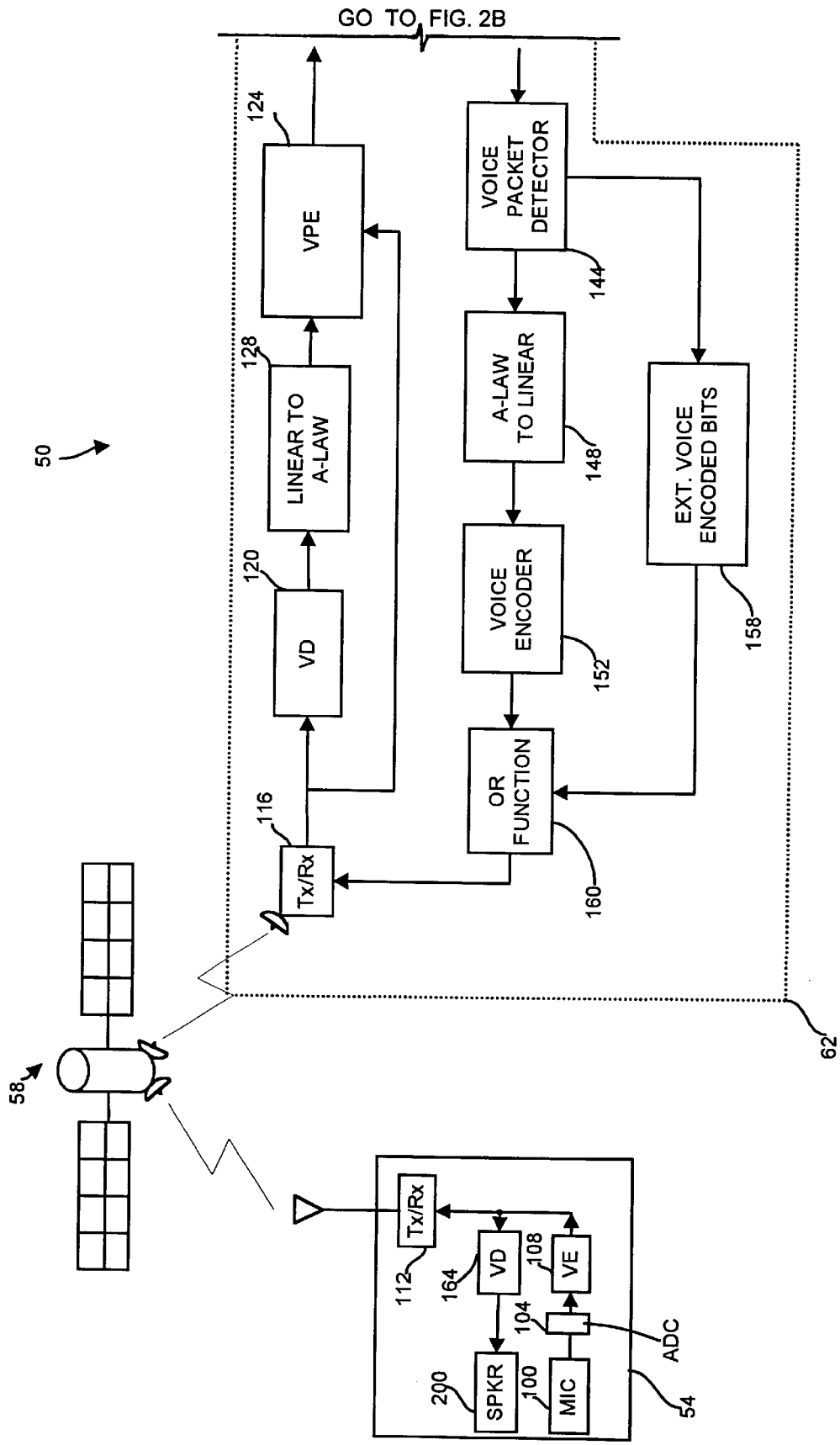
FIGS. 2A and 2B illustrate a system employing the method and apparatus of the present invention.
Figure 2B:
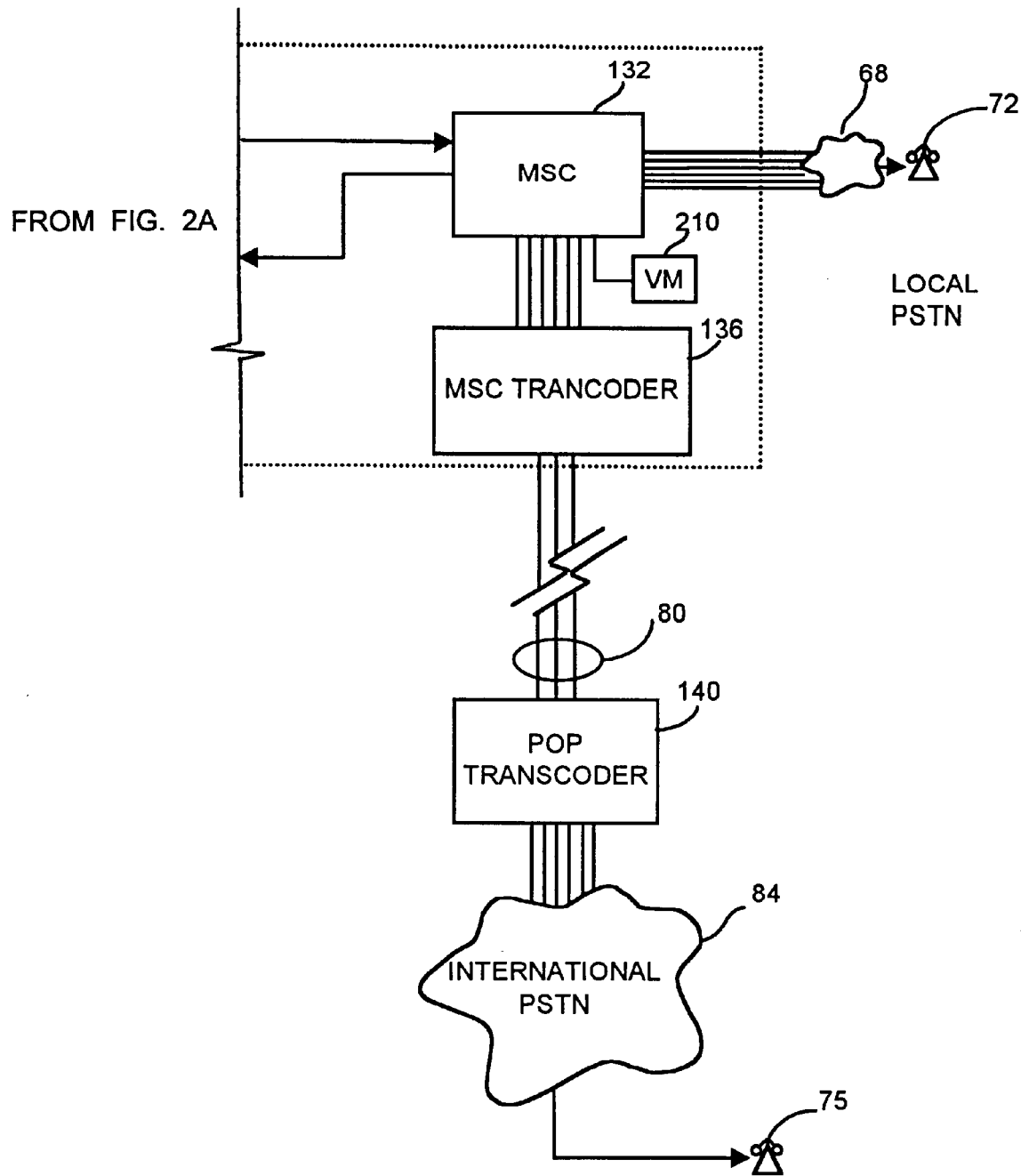

FIGS. 2A and 2B show a detailed illustration of a system employing the method and apparatus of the present invention. The subscriber unit 54 includes a microphone 100, which is coupled to an analog-to-digital converter (ADC) 104. The ADC 104 quantizes the output of the microphone 100 into 8N kbps (eight thousand samples per second, wherein each sample is represented by N bits). The quantized 8N kbps voice information signal is coupled to a voice encoder 108, which compresses the 8N kbps signal to, for example, a 4 kbps signal. This compression is accomplished using techniques known in the art. The 4 kbps voice information signal is coupled to a transceiver 112, which converts the 4 kbps signal to an appropriate amplitude and frequency for transmission to the satellite 58. The satellite receives the 4 kbps voice information signal and retransmits it down to the gateway station 62.

In the receive path, the gateway station 62 includes a transceiver 116 capable of receiving the signal downlinked from the satellite 58. The output of the transceiver 116 is the same 4 kbps signal that was uplinked to the satellite 58 by the transceiver 112 of the subscriber unit 54. The signal from the transceiver 116 is coupled to a voice decoder 120. The voice decoder 120 decompresses the 4 kbps signal into a 8N kbps (eight thousand samples per second, each sample represented by N bits) PCM signal. The 8N kbps signal is coupled to a linear to an A-law converter 128, which converts the 8N kbps signal from a linear format to a 8N kbps A-law format, using known techniques.

According to the present invention, the A-law formatted PCM signal is coupled to a voice packetizer and embedder (VPE) 124, which steals the least significant bits (LSB) of PCM samples and replaces those bits with the compressed bits received from the satellite 58. This encodes the compressed information into the decompressed information, and destroys the decompressed information stored in the LSBs of the samples. However, the information lost by stealing the LSBs will negligibly effect the voice quality of the communication link. Additionally, the VPE 124 appropriately adds a header on the data to indicate the presence of the compressed information in the LSBs of the samples.

After the VPE 124 appropriately processes the voice information signals, the signals are passed to a mobile switching center (MSC) 132. The MSC 132 determines the PSTN 68 or 84 to which the voice information should be routed. If the voice information needs to be routed to a local telephone 72, the 8N kbps voice information is routed to a local PSTN 68, and further routed to the appropriate telephone 72. The signal path uses the 8N kbps voice information signal to reproduce voice as sent from the subscriber unit 54.

Figure 3:
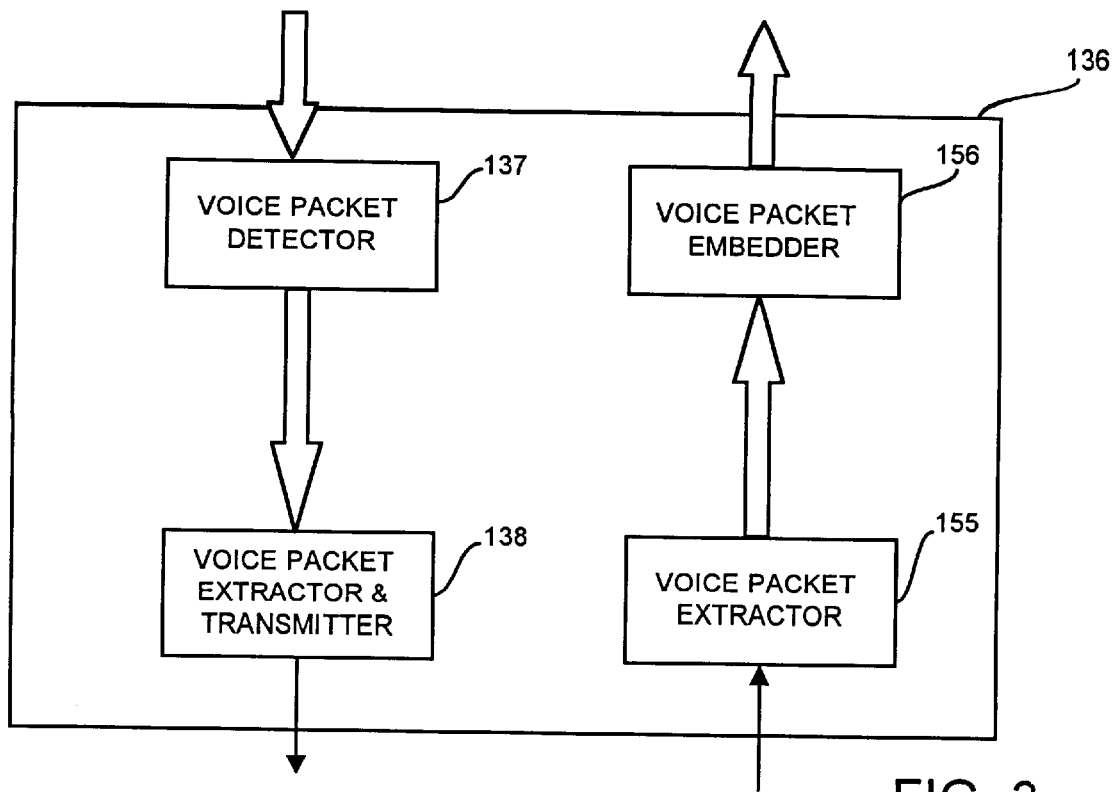
FIG. 3 is a detailed block diagram of a MSC transcoder.

If the voice information needs to be routed to a international PSTN 84, the MSC 132 passes the voice information to a MSC transcoder 136 according to the present invention. FIG. 3 is a detailed illustration of the functions included in the MSC transcoder 136. The information from the MSC 132 is passed to a voice packet detector 137, which examines the headers on the voice information from the MSC 132 to determine if compressed voice information has been placed in the LSBs of the decompressed voice signal. It is noted that PCM signals arriving at the MSC 132 could be voiceband data in which case the voice encoded bits will not be present in the LSBs. If the compressed voice information is present in the decompressed voice information, a voice packet extractor and transmitter 138 uses the appropriate LSBs to assemble the compressed voice information as relayed by the satellite 58. Once assembled, the compressed voice information is sent across leased E1 lines 80 to a point of presence (POP) transcoder 140. Since the information transferred across the leased E1 lines 80 is compressed, fewer leased E1 lines 80 are needed to transfer information from the MSC 132 to the international PSTN 84.

Figure 4:
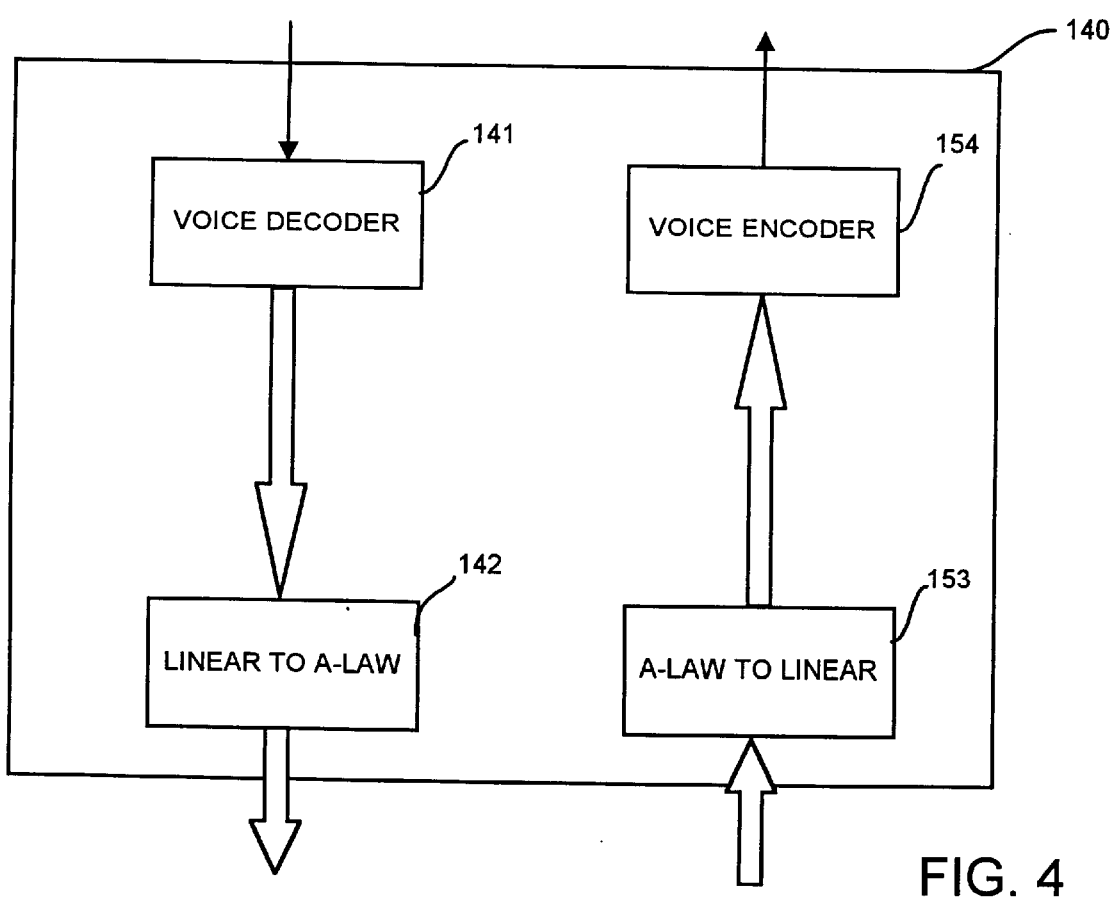
FIG. 4 is a detailed block diagram of a POP transcoder.

According to the present invention, the POP transcoder 140 is located physically at the end of the leased line near the international PSTN 84 location. The POP transcoder 140, as shown in FIG. 4, includes a voice decoder 141 and a linear to A-law converter 142. The voice decoder 141 decompresses the compressed voice information in a similar fashion to the voice decoder 120 of the gateway station 62 and passes the decompressed voice information to the linear to A-law converter 142, which functions in an identical fashion to block 128 of the gateway station 62. After the information is converted to A-law format it is coupled to the international PSTN 84. In turn, the international PSTN 84 routes the decompressed voice information to the appropriate telephone 76.

In addition to receiving signals from the satellite 58, the gateway station 62 is capable of receiving signals from land line users at telephones 72, 76. If the land line signals that are to be transmitted to the subscriber unit 54 originate from the local PSTN network 68 at 8N kbps, the MSC 132 receives the signals and transfers them to a voice packet detector 144, which functions in a similar fashion to the voice packet detector 137 of the MSC transcoder 136. The voice packet detector 144 determines if the LSB of the signal is coded with compressed voice information. If the signals originate from the local PSTN 68, they will not be encoded with the compressed voice information. The local PSTN signal is then passed to an A-law to linear converter 148, the function of which is known in the art. The linear formatted 8N kbps signal is passed to a voice encoder 152, which compresses the 8N kbps signal into, for example, a 4 kbps signal in a manner similar to that of the voice encoder 108 of the subscriber unit 54.

Alternatively, information may be received from the international PSTN 84. That is, voice information from a user at a telephone 76 is passed to the international PSTN 84, which passes the 8N kbps signal to the POP transcoder 140. The POP transcoder 140, according to the present invention, converts the information from A-law format to linear format using an A-law to linear converter 153. After the format conversion is complete, the A-law formatted 8N kbps information is compressed into, for example, a 4 kbps signal by a voice encoder 154 for transmission across the leased E1 lines 80. By transmitting the compressed signal (rather than the 8N kbps signal) across the leased E1 lines the present invention reduces the number of leased lines 80 needed as there is less information transferred per user for a given period of time.

The leased E1 lines 80 transfer the information from the POP transcoder 140 to the MSC transcoder 136. The MSC transcoder 136, as shown in FIG. 3, converts the compressed signal to a 8N kbps signal that has compressed version of its information encoded in the LSBs of the signal. Specifically, a block 155 performs the function of extracting and decompressing the voice information from the leased E1 line 80. After the voice information is extracted and decompressed, it is passed to a voice packet embedder 156, which performs a similar function to the VPE 124 located in the gateway 62. This conversion is necessary because the MSC 132 is designed to interface only with 8N kbps signals.

After the information is properly processed by the MSC transcoder 136, the information is passed to the MSC 132. The MCS 132, in turn, routes the information to a voice packet detector 144. When the 8N kbps signals encoded with compressed information are received at the voice packet detector 144 via the MSC 132, they are routed to an externally voice encoded information block 158. The externally voice encoded information block 158 strips the LSBs containing the compressed voice information from the 8N kbps signal, which results in a compressed signal representative of voice information.

The voice information from blocks 152 and 158 is passed to an OR function 160, which selects whether the signal from the voice encoder 152 or the signal from the externally voice encoded information block 158 us passed to the transceiver 116. The information routed to the transceiver 116 is transmitted via satellite 58 to the subscriber unit 54. The transceiver 112 of the subscriber unit 54 receives the compressed voice information from the satellite 58 and appropriately down-converts the signal for use by a voice decoder 164, which converts the compressed voice information into decompressed voice information in a similar fashion to the voice decoder 120 of the gateway station 62. The voice information is then passed from the voice decoder 164 to a speaker 200, or other audio device, which manifests the audio to the user of the subscriber unit.

The functions of the system of the present invention may be mathematically described with respect to FIGS. 2A and 2B. Considering FIGS. 2A and 2B, let $B=[b_0 b_1 \ldots b_{M-1}]$ be the bit-stream received by the voice decoder 120 in the gateway station 62. Let $S_{out}=[S_0 S_1 \ldots S_{N-1}]$ represents a frame of 8 bit PCM samples at the output of the A-law converter 128. The inputs to the VPE 124 are $S_{out}$ and B. The output of the voice packetizer in the VPE 124 may be represented as shown in Equation 1.

$$B' = B \begin{bmatrix} 0 & 0\ldots 0 & 100\ldots & 000\ldots 0 \\ 0 & 0\ldots 0 & 010\ldots & 000\ldots 0 \\ 0 & 0\ldots 0 & 001\ldots & 000\ldots 0 \\ \vdots & & & \\ 0 & \underline{0\ldots 0} & \underline{000\ldots} & \underline{100\ldots 0} \\ & M_x N_1 & M_x M & M_x N_2 \end{bmatrix} + [h_0 h_1 h_2 \ldots h_{N_t-1} \ldots 0 t_0 t_1 t_2 t_3 \ldots t_{N_2-1}]$$

Equation 1

Wherein B' is the voice encoded packet in the VPE 124. Additionally, $h_i$ is a $N_1$ sequence of header bits of length $N_1$ that includes a start flag, unique word, and other voice related flags. The variable $t_i$ denotes the tail bits, which typically is an end-of-packet flag.

The output of the VPE 124 of the gateway 62 is described by Equations 2 and 3.

$$S'_{out}=[s'_0 s'_1 \ldots s'_{N-1}]$$

Equation 2

$$s'_i = \begin{cases} s_i \ \&[1111110] + b'_i & 0 \leq i \leq N_1 + M + N_2 - 1 \\ s_i & N_1 + M + N_2 \leq i \leq N - 1 \end{cases}$$

Equation 3

Wherein & represents a bitwise logical AND operation. Furthermore, the 8 bit A-law encoded speech sample and modified speech sample are denoted as [MSB . . . LSB].

Input to the MSC transcoder 136 is the output of the VPE 124 of the gateway station 62 as defined by Equations 2 and 3. The output of the MSC transcoder 136 is represented by Equations 4 and 5.

$$B''=[b''_0 b''_1 \ldots b''_{N_1+M+N_2-1}]$$

Equation 4

$$b''_i = LSB(s'_i \&[00000001])$$

Equation 5

The compression achieved over the leased E1 lines for voice transfer is shown in Equation 6.

$$g = \frac{8N_1}{N_1 + M + N_2} \qquad \text{Equation 6}$$

For example, consider a mobile satellite system operating at a frame interval of 40 ms. At 8 Khz sampling rate for voice, the number of speech samples for a frame is N=320. Assume that the voice encoder used in the system is 3 kbps and, therefore, M=120. Assuming one byte for a start flag, one byte for an end flag, two bytes of unique word, and one byte of voice-related flags such as voice activity or voice quality, we have $N_1$=32, $N_2$=8. Therefore, compression over the leased E1 line is 16. For this example, the voice encoded packet B' is represented by Equation 7.

$$B' = [01111110 UU \ldots UFFFFFFFFb_0 b_1 \ldots b_{119} 01111110] \qquad \text{Equation 7}$$

The POP transcoder 140 extracts the voice encoded bits from the received bit stream B" before providing it to the voice decoder 141. Extraction of the voice encoded bitstream is represented by Equation 8.

$$B''' = B' \begin{bmatrix} 000\ldots0 \\ 000\ldots0 \\ \cdot N_1 \times M \\ 000\ldots0 \\ 100\ldots0 \\ 010\ldots0 \\ 001\ldots0 \\ \vdots \\ \cdot M \times M \\ 000\ldots1 \\ 000\ldots0 \\ 000\ldots0 \\ \cdot N_2 \times M \\ 000\ldots0 \end{bmatrix} \qquad \text{Equation 8}$$

Equations 2–5 and 8 verify that B'''=B. Therefore, the input to the voice decoder 141 in the POP transcoder 140 is identical to the input to the voice decoder 120 in the gateway station 62. Since the inputs are identical the speech represented by the inputs is identical. The voice information is transferred efficiently over the leased E1 lines.

Figure 5:
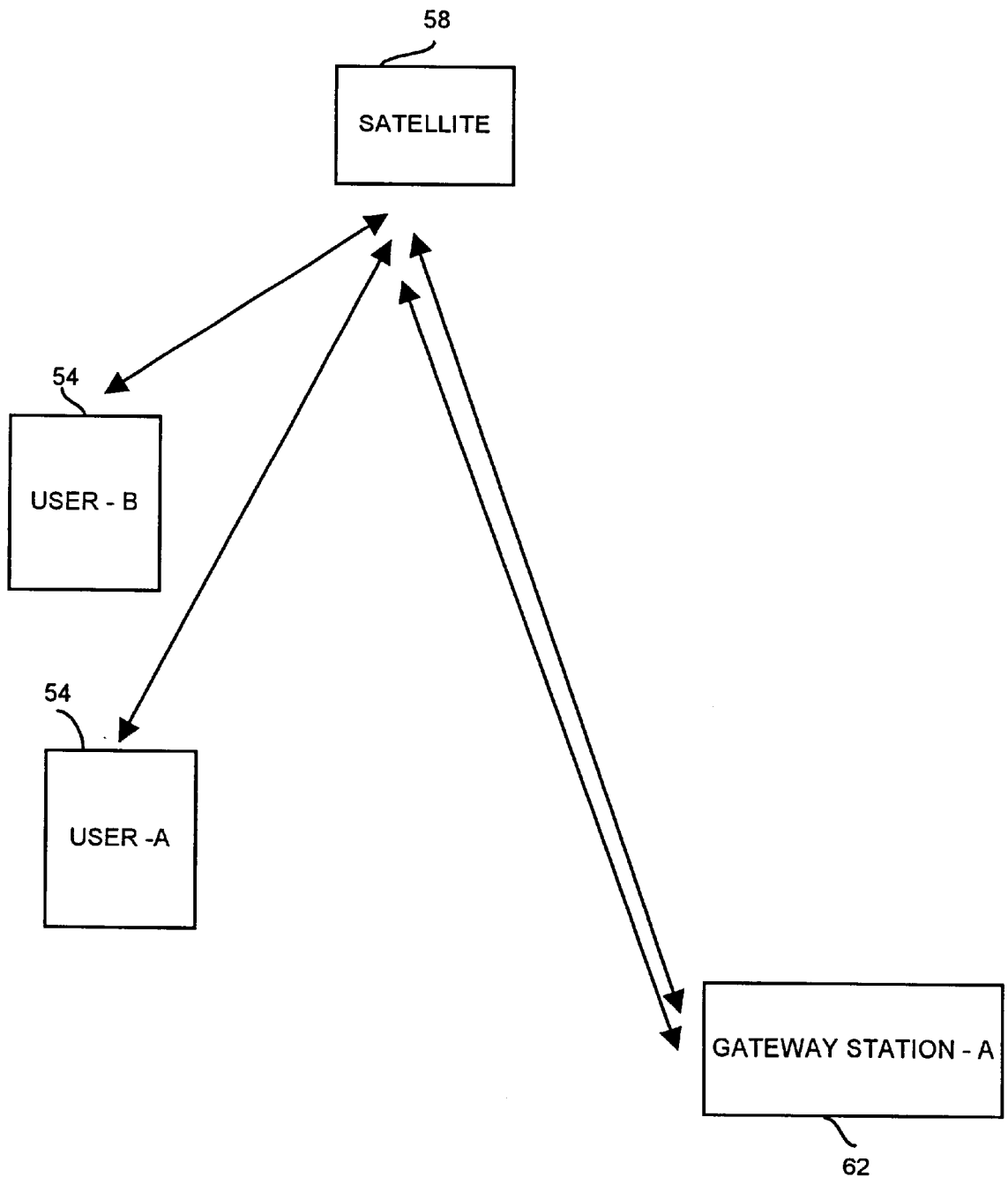
FIG. 5 is an illustration of a mobile-to-mobile communication link carried by a single satellite in accordance with the method of the present invention.
Figure 6:
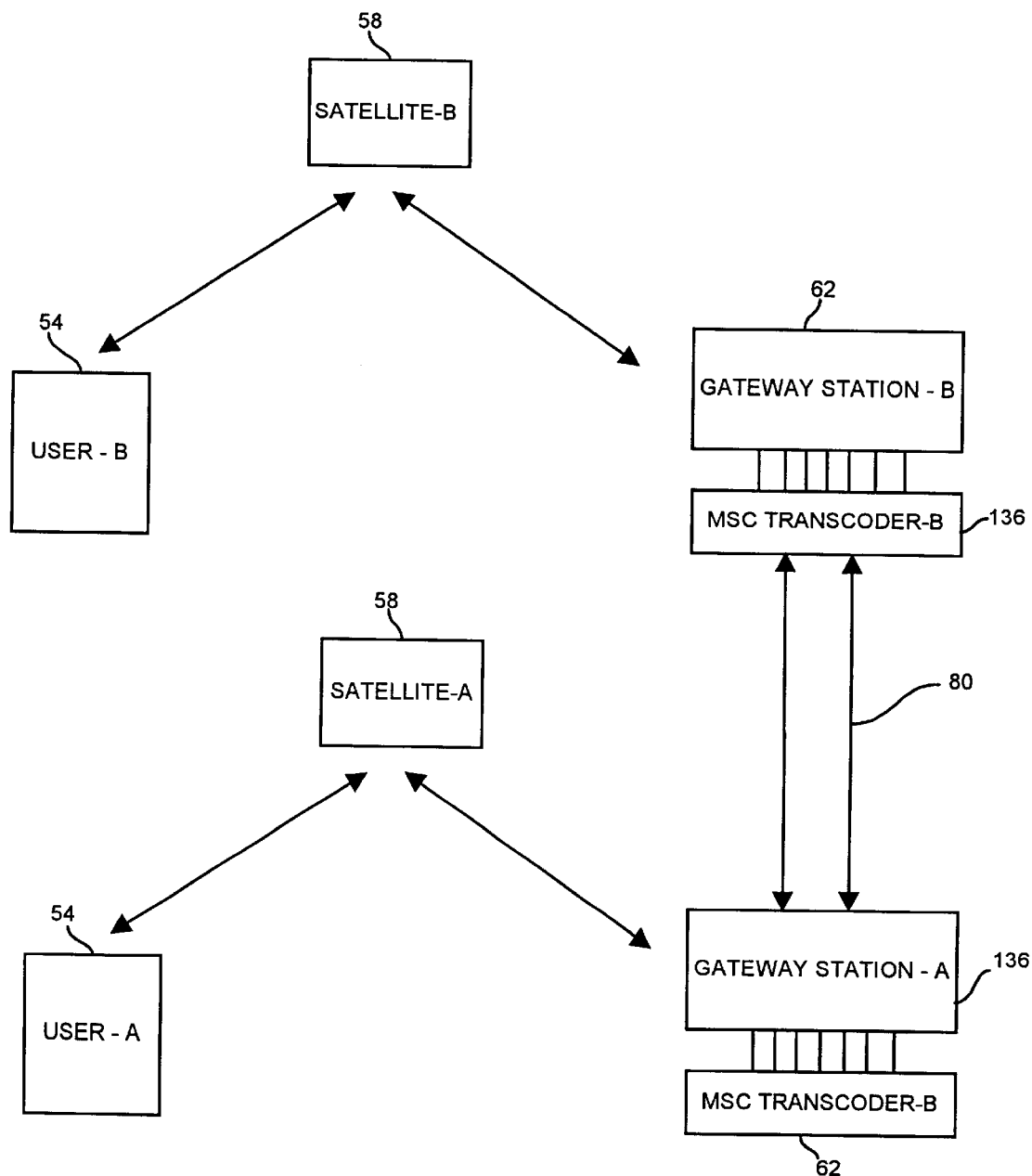
FIG. 6 is an illustration of a mobile-to mobile communication link carried over leased lines in accordance with the present invention.

FIGS. 5 and 6 illustrate two additional applications of the preferred embodiment of the present invention. The configurations shown in FIGS. 5 and 6 are relevant to mobile-to-mobile call configurations. The embodiment shown in FIG. 5 improves the voice quality that would otherwise be degraded due to two compression/decompression schemes. The embodiment shown in FIG. 5 allows the system to transfer the voice encoded bits generated at subscriber unit 54 to another subscriber unit without an intermediate compression/decompression scheme.

The configuration shown in FIG. 6, reduces the number of leased lines 80 needed between two gateway stations 62 handling satellite communications from subscriber units 54. In this configuration, only the voice encoded bits are transferred between the transcoders 136 across leased lines 80. This configuration is illustrative of the fact that the present invention is not only useful in mobile to terrestrial communications, but also in mobile to mobile communications.

Of course, it should be understood that a range of changes and modifications can be made to the preferred embodiment described above. For example, as shown in FIGS. 2A and 2B, the present invention may be used in voice mail applications. Specifically, a voice mail system 210 connected to the MSC 132 may be used to store voice mail having compressed information embedded in the decompressed information. In conventional voice mail applications, if a mobile user deposits voice mail to another mobile user, and if the other mobile user accesses his voice mail box using a mobile phone, then voice information is compressed and decompressed twice, thereby resulting in loss of voice quality. By using the preferred embodiment of the present invention, it is possible to steal LSB of PCM samples and embed voice packets before storing the voice information in the voice mail system. When the voice mail is retrieved, then the gateway identifies the presence of voice encoded packet according to the present invention and hence passes it straight to the user retrieving the voice mail, thereby avoiding further loss in voice quality. It is therefore intended that the foregoing detailed description be regarded as illustrative rather than limiting and that it be understood that it is the following claims, including all equivalents, which are intended to define the scope of this invention.

What is claimed is:

1. A gateway for transferring data representative of voice from a first location to a second location comprising:

a voice decoder for decompressing a compressed voice signal received from a satellite;

a voice packetizer and embedder for embedding the compressed signal within the decompressed signal; and a transcoder for removing the embedded compressed signal from the decompressed signal and delivering the compressed signal to a communication line.

2. The gateway of claim 1, wherein the transcoder comprises a voice packet detector for detecting the compressed signal within the decompressed signal.

3. The gateway of claim 2, wherein the transcoder (136) further comprises a voice packet extractor and transmitter for removing the embedded compressed signal from the decompressed signal and for delivering the compressed signal to the communication line.

4. The gateway station of claim 1, wherein the decompressed signal represents samples of an analog signal.

5. The gateway station of claim 4, wherein the decompressed signal representing samples of an analog signal comprise least significant bits.

6. The gateway station of claim 5, wherein the compressed signal is embedded in the decompressed signal by replacing the least significant bits of the decompressed signal with the compressed signal.

7. The gateway station of claim 1, wherein the compressed signal has a data rate less than 8 kilobits per second.

8. The gateway station of claim 1, wherein the decompressed signal has a data rate of 64 kilobits per second.

9. The gateway of claim 1, further comprising a voice mail system in communication with the voice packetizer and embedder, wherein the voice mail system (200) is used to store voice mail messages comprising a compressed signal embedded within a decompressed signal.

10. A method for transferring data representative of voice from a first location to a second location comprising:

decompressing a compressed voice signal received from a satellite to create a decompressed signal;

embedding the compressed signal within the decompressed signal;

removing the embedded compressed signal from the decompressed signal; and delivering the compressed signal to a communication line.

11. The method of claim 10, wherein a transcoder performs the step of detecting the compressed signal within the decompressed signal.

12. The method of claim 11, wherein the transcoder performs the step of removing the embedded compressed signal from the decompressed signal; and delivering the compressed signal to the communication line.

13. The method of claim 10, wherein the decompressed signal represents samples of an analog signal.

14. The method of claim 13, wherein the decompressed signal representing samples of an analog signal comprise least significant bits.

15. The method of claim 14, wherein the compressed signal is embedded in the decompressed signal by replacing the least significant bits of the decompressed signal with the compressed signal.

16. The method of claim 10, wherein the compressed signal has a data rate less than 8 kilobits per second.

17. The method of claim 10, wherein the decompressed signal has a data rate of 64 kilobits per second.

18. A method for storing data representative of voice comprising the steps of:

decompressing a compressed voice signal received from a satellite to create a decompressed signal;

embedding the compressed signal within the decompressed signal;

delivering the decompressed signal embedded with the compressed signal to a voice mail system; and storing the decompressed signal embedded with the compressed signal in the voice mail system.

\* \* \* \* \*